UNITED STATES PATENT OFFICE.

CHARLES E. ACKER, OF NIAGARA FALLS, NEW YORK, ASSIGNOR TO TIN PRODUCTS COMPANY, A CORPORATION OF NEW YORK.

PROCESS OF TREATING DETINNED IRON AND RESIDUES.

No. 856,753.        Specification of Letters Patent.        Patented June 11, 1907.

Application filed October 4, 1906. Serial No. 337,411.

*To all whom it may concern:*

Be it known that I, CHARLES E. ACKER, a citizen of the United States, residing at Niagara Falls, in the county of Niagara and State of New York, have invented certain new and useful Improvements in Processes of Treating Detinned Iron and Residues, of which the following is a specification.

This invention relates to the treatment of the detinned iron and residues which remain after the tin-plate scrap, alloys and other tin-bearing materials have been subjected to the action of chlorin, converting the tin into its chlorid. The residual mass, on account of its numerous interstices, retains a considerable percentage of the tin salt, which is usually not recovered.

According to the present process, the detinned material is washed with anhydrous liquid, especially a solvent for stannic chlorid, and specifically with carbon tetrachlorid or anhydrous petroleum. The wash liquid, containing the dissolved chlorid and usually some chlorin, is then run off and may be used for the treatment of other residues. After repeated use, the dissolved chlorin may be removed by adding metallic tin and the stannic chlorid by water, the hydrated chlorid being immiscible with the wash liquid and separating therefrom. The detinned material may be again washed with another portion of the anhydrous liquid containing little or no tin chlorid and chlorin. After the wash liquid is drained off, the portion adhering to the residue may be removed by a current of air, the air preferably being drawn into the treating chamber and over the material by means of an exhaust pump. The mixed air and vapor is then passed through a solvent for the vapor, preferably a heavy mineral oil. The removal of the residual wash liquid may be facilitated by closing and exhausting the treating chamber and heating its contents to a temperature sufficient to evaporate the liquid. The chamber may then be opened and the current of air drawn through, as described.

The detinned iron resulting from the treatment of scrap with chlorin, is usually coated in part with a very thin film of ferric chlorid. In order to remove this film and protect the surfaces from rusting upon exposure to the atmosphere, it is desirable to submerge the metal, either before or after removal from the detinning chamber, in a weak alkaline bath, for example an aqueous solution of sodium hydroxid or carbonate.

I claim:

1. The process of treating detinned iron and residues, which consists in washing the material with an anhydrous liquid capable of dissolving stannic chlorid.

2. The process of removing stannic chlorid from the surfaces of detinned iron and residues, which consists in washing the material with carbon tetrachlorid.

3. The process of treating detinned iron and residues, which consists in successively washing the material with different portions of an anhydrous liquid capable of dissolving stannic chlorid.

4. The process of removing wash liquors from detinned iron and residues, which consists in draining the material, and subjecting it to a current of air.

5. The process of removing wash liquors from detinned iron and residues, which consists in draining the material, subjecting it to a current of air, and passing the mixed air and vapor through a solvent for the vapor.

6. The process of removing wash liquors from detinned iron and residues, which consists in draining the material, subjecting it to a current of air, and passing the mixed air and vapor through a non-volatile oil.

7. The process of removing wash liquors from detinned iron and residues, which consists in draining the material, heating it, and subjecting it to a current of air.

8. The process of removing wash liquors from detinned iron and residues, which consists in draining the material, heating it *in vacuo*, and subjecting it to a current of air.

9. The process of removing wash liquors from detinned iron and residues, which consists in draining the material, heating it, subjecting it to a current of air, and passing the mixed air and vapor through a solvent for the vapor.

10. The process of treating detinned iron and residues, which consists in successively washing the material with an anhydrous liquid capable of dissolving stannic chlorid and an alkaline solution.

In testimony whereof, I affix my signature in presence of two witnesses.

CHARLES E. ACKER.

Witnesses:
OTTO J. JACOBY,
GERALDINE M. McBRIDE.